United States Patent
Klein et al.

(10) Patent No.: US 11,276,098 B2
(45) Date of Patent: Mar. 15, 2022

(54) DATABASE LOOKUP USING A SCANNABLE CODE FOR PART SELECTION

(71) Applicant: Xilinx, Inc., San Jose, CA (US)

(72) Inventors: Matthew H. Klein, Redwood City, CA (US); Wei Yee Jocelyn Teo, Singapore (SG); Craig E. Taylor, San Jose, CA (US)

(73) Assignee: XILINX, INC., San Jose, CA (US)

( * ) Notice: Subject to any disclaimer, the term of this patent is extended or adjusted under 35 U.S.C. 154(b) by 210 days.

(21) Appl. No.: 15/793,332

(22) Filed: Oct. 25, 2017

(65) Prior Publication Data

US 2019/0122282 A1    Apr. 25, 2019

(51) Int. Cl.
| | |
|---|---|
| *G06Q 30/06* | (2012.01) |
| *G06F 21/30* | (2013.01) |
| *G06K 7/10* | (2006.01) |
| *G06F 16/903* | (2019.01) |
| *G06F 30/00* | (2020.01) |

(52) U.S. Cl.
CPC ....... *G06Q 30/0627* (2013.01); *G06F 16/903* (2019.01); *G06F 21/30* (2013.01); *G06F 30/00* (2020.01); *G06K 7/10* (2013.01)

(58) Field of Classification Search
CPC ... G06Q 30/0627; G06F 16/903; G06F 21/30; G06K 7/10
USPC ...................................................... 705/26.63
See application file for complete search history.

(56) References Cited

U.S. PATENT DOCUMENTS

| | | | |
|---|---|---|---|
| 5,984,190 A | * | 11/1999 | Nevill ................... H01L 23/544 235/492 |
| 6,359,248 B1 | | 3/2002 | Mardi |
| 6,674,036 B1 | | 1/2004 | Mardi |

(Continued)

OTHER PUBLICATIONS

J. W. Lee, Daihyun Lim, B. Gassend, G. E. Suh, M. van Dijk and S. Devadas, A technique to build a secret key in integrated circuits for identification and authentication applications, 2004, 2004 Symposium on VLSI Circuits, Digest of Technical Papers, pp. 176-179. (Year: 2004).*

(Continued)

*Primary Examiner* — Jason B Dunham
*Assistant Examiner* — Brittany E Bargeon
(74) *Attorney, Agent, or Firm* — Patterson + Sheridan, LLP

(57) ABSTRACT

Embodiments described herein include techniques for providing information regarding a hardware part using a scannable code so that a customer can make an informed decision when placing the hardware part in a larger computing system. A customer may purchase hardware parts that are categorized into a certain bin which has guaranteed range of power consumption or performance. The customer may over design the computing system to accommodate the worst parameter in the range (e.g., the minimum performance or the maximum power consumption) to ensure the timing or power specifications are not violated. Instead, the embodiments herein provide a scannable code on the hardware part which the customer can use to access a database which stores more granular information about the part. The customer can use the performance parameters to make better informed decisions to determine where to place the part in the computing system.

20 Claims, 5 Drawing Sheets

| SEMICONDUCTOR DATA STORAGE | | 104 | |
|---|---|---|---|
| CIRCUIT-BASED IDENTIFIER DATA    109 | 2D MARK CODE    110 | CIRCUIT PACKAGE DATA    114 | |
| IDENTIFIER 1 | 2D CODE 1 | DATA 1 | |
| IDENTIFIER 2 | 2D CODE 2 | DATA 2 | |
| IDENTIFIER 3 | 2D CODE 3 | DATA 3 | |
| . | . | . | |
| . | . | . | |
| . | . | . | |

(56) References Cited

U.S. PATENT DOCUMENTS

| | | | |
|---|---|---|---|
| 6,720,643 B1* | 4/2004 | Fox | G11C 5/02 |
| | | | 257/686 |
| 6,984,533 B1 | 1/2006 | Regos et al. | |
| 9,697,402 B1 | 7/2017 | Khor et al. | |
| 10,108,925 B1* | 10/2018 | Taylor | G06F 21/44 |
| 2006/0053357 A1* | 3/2006 | Rajski | G01R 31/01 |
| | | | 714/742 |
| 2007/0164729 A1* | 7/2007 | Cowburn | G01R 31/31718 |
| | | | 324/759.02 |
| 2009/0152543 A1* | 6/2009 | Bonaccio | H01L 22/14 |
| | | | 257/48 |

OTHER PUBLICATIONS

Specification and drawings for U.S. Appl. No. 15/204,924, filed Jul. 7, 2016, Taylor.
Specification and drawings for U.S. Appl. No. 15/473,395, filed Mar. 29, 2017, Xiong et al.

* cited by examiner

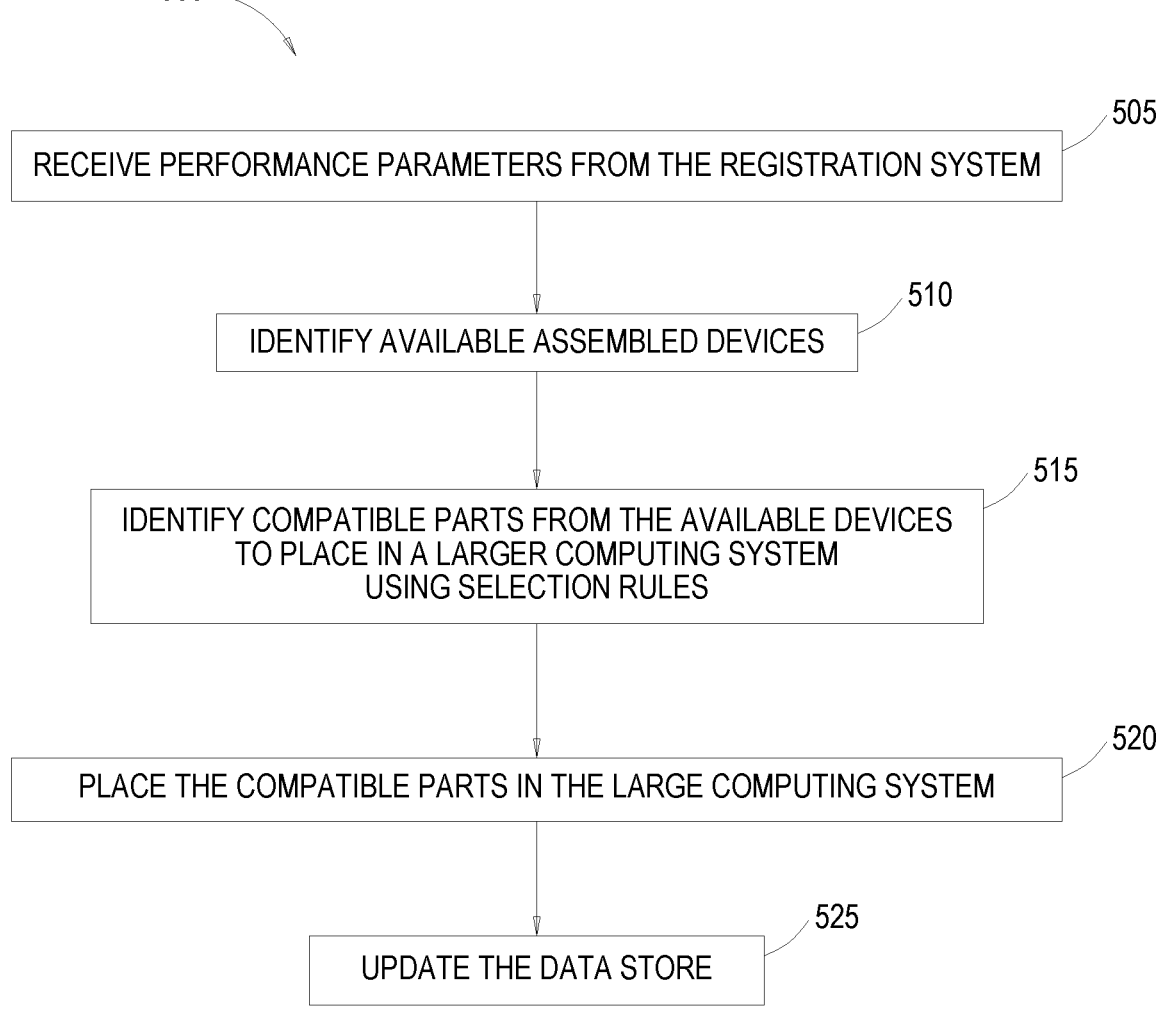

DATABASE LOOKUP USING A SCANNABLE CODE FOR PART SELECTION

TECHNICAL FIELD

Examples of the present disclosure generally relate to electronic circuits and, in particular, to querying a database to retrieve performance parameters using a scannable code.

BACKGROUND

Currently, customers order computing hardware parts from manufactures using coarse information regarding power consumption and performance. The hardware parts may be grouped into different bins which have different grades or levels. For example, power consumption may have two grades or levels—i.e., low power and high power devices while performance is divided into different grades which may include two, three, four or more performance ranges.

The performance and power consumption of the individual parts may vary widely within each grade. For example, a first hardware part may be categorized in the same performance and power consumption grade as a second hardware part but have 10% better performance and consume 5% more power. Nonetheless, the customer may design its computer system that includes the parts using the maximum power and minimum performance values of the particular grade of the parts. That is, if the purchased hardware parts have a power consumption grade that varies between 1 to 1.5 Watts, the customer must design the computing system as if every hardware part draws 1.5 Watts even though many of the parts may draw less than that.

SUMMARY

Techniques for optimizing the placement of semiconductor packages in a computing system are described. One example is a method that includes scanning a code using a scanning device, wherein the code is disposed in a semiconductor package that includes an integrated circuit, receiving a performance parameter corresponding to the integrated circuit using data retrieved from scanning the code, determining whether the integrated circuit satisfies a predefined selection rule corresponding to a first location in an assembled computing system using the performance parameter, and placing the semiconductor package in the first location on the assembled computing system.

One example described herein is a system that includes a bar code scanner configured to scan a code disposed in a semiconductor package that includes an integrated circuit, a processor, and memory comprising an assembly application, wherein the assembly application, when executed by the processor performs an operation. The operation includes receiving a performance parameter corresponding to the integrated circuit using data retrieved from scanning the code, determining whether the integrated circuit satisfies a predefined selection rule corresponding to a first location in an assembled computing system using the performance parameter, and instructing the semiconductor package to be placed in the first location on the assembled computing system.

One example described herein is a computer readable storage medium that includes computer-readable program code which, when executed by a computing processor, performs an operation. The operation includes receiving data from scanning a code using a scanning device, wherein the code is disposed in a semiconductor package that includes an integrated circuit, receiving a performance parameter corresponding to the integrated circuit using the data retrieved from scanning the code, determining whether the integrated circuit satisfies a predefined selection rule corresponding to a first location in an assembled computing system using the performance parameter, and instructing the semiconductor package to be placed in the first location on the assembled computing system.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 5 is a flow diagram for assembling a computing system using performance parameters for individual parts, according to one embodiment.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
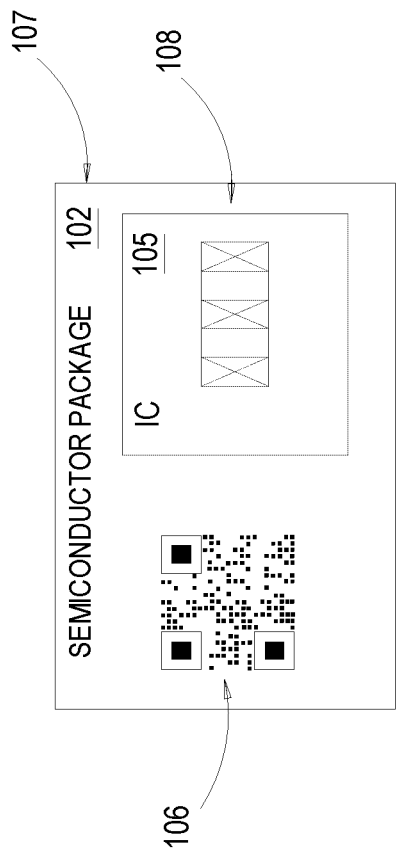
FIG. 1 is a diagram illustrating a semiconductor package and semiconductor data storage, according to one embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated, or if not so explicitly described.

Embodiments described herein include techniques for providing information regarding a hardware part using a scannable code so that a customer can make an informed decision when placing the hardware part in a larger computing system. A customer may purchase hardware parts that are categorized into a certain bin which has guaranteed range of power consumption or performance—e.g., a max/min power consumption and a max/min performance. Many manufactures may mark the ranges on the hardware part itself. The customer may over design the computing system to accommodate the worst parameter in the range (e.g., the minimum performance or the maximum power consumption) to ensure the timing specifications are not violated or the computing system that includes the hardware part does not over heat.

The actual performance of the individual hardware parts varies within the ranges defined by the bin in which the hardware parts are categorized. A customer could test the hardware parts to determine their actual values, but running these tests themselves is cumbersome and expensive. Instead, the embodiments herein provide a scannable code on the hardware parts which the customer can use to access a database which stores more granular information about the specific hardware part. In one embodiment, each scannable code uniquely identifies the hardware part on which it is disposed. As such, the customer can use an ID generated by scanning the code to query the database and identify performance parameters for the hardware part such as the actual power consumed, performance data, leakage current, heat generation, life cycle data, and the like.

The customer can use the performance parameters to make better informed decisions (relative to relying solely on the bin in which the part was categorized) to determine what part to use, and where to place the part in the computing system. For example, some applications may require a hardware part that has a block RAM speed above a threshold where only 10% of the parts in the bin have speeds that satisfy the threshold. Using the scannable codes, the customer can identify the hardware parts with the satisfactory speeds and assign them to the specific applications while the other hardware parts can be used for other applications with less stringent requirements. In another example, the customer may line up the hardware parts in parallel within an enclosure. Using the scannable codes the customer can identify the parts that have the highest power consumption values (which typically generate the most heat) and place these parts in the locations of the enclosure that receive the most airflow, thereby improving the efficiency of the cooling system in the enclosure. Thus, the embodiments described herein can improve the operation of the computing system (whether by performance, heating, cooling, power consumption, etc.) by providing techniques for accessing more granular information regarding the hardware parts which can be used to identify optimal placement of the parts in a larger computing system.

FIG. 1 is a diagram illustrating a semiconductor package 102 and semiconductor data storage 104, according to an example. The semiconductor package 102 includes one or more dies or ICs 105 fabricated according to known methods. The semiconductor package 102 also includes other components for coupling to external circuitry, for encapsulating the ICs 105, and for performing other functions as is generally known. A 2-dimensional ("2D") bar code or 2D mark 106 (e.g., a QR code) is located on a support member 107 of the semiconductor package 102. The 2D mark 106 uniquely identifies the semiconductor package 102 (or an integrated circuit (IC) 105 in the package 102). Although a 2D mark 106 is shown, the embodiments herein can be used with any scannable code such as a 1-dimensional bar code or a 3-dimensional bar code which can protrude (or recess) from a surface of the support member 107 (e.g., a printed circuit board or other substrate). In another embodiment, the 2D mark 106 may be disposed on the IC 105 or other substrates in the package 102.

A semiconductor data storage 104 stores 2D marks (or, more specifically, the values that are encoded to form the 2D mark, referred to as "2D mark codes 110"), and associates each 2D mark with circuit-based identifier data 109 as well as with circuit package data 114. Circuit-based identifier data 109 is associated with a circuit-based identifier 108 located within the semiconductor package 102 on the IC 105. Circuit-based identifier 108 comprises a set of hard-wired circuit features that together, store a value that uniquely identifies the semiconductor package 102. The circuit-based identifier 108 is readable from outside of the semiconductor package 102 by a probing device. In some embodiments, the circuit-based identifier 108 comprises a series of fuses that are either opened or closed in order to define a value in binary format. The circuit package data 114 includes performance parameters for the IC 105 associated with the circuit-based identifier data 109 and the 2D mark code 110.

In some embodiments, the value of the circuit-based identifier data 109 includes indications of one or more of the lot number of the wafer from which the IC 105 within semiconductor package 102 originated, the wafer number identifying the wafer from which the IC 105 within the semiconductor package 102 originated, and the coordinates of the IC 105 on that wafer. These numbers therefore uniquely identify the IC 105 within semiconductor package 102. In some embodiments, the 2D mark code 110 comprises a randomly generated number. In other embodiments, the 2D mark code 110 includes indications of one or more values that uniquely identify the semiconductor package 102 on which the 2D mark 106 is placed. In some embodiments, the 2D mark code 110 includes an indication of a location at which the semiconductor package 102 is marked with the 2D mark 106, an identification of the entity (e.g., corporation) that marked the semiconductor package 102 with the 2D mark 106, an indication of an assembly lot number, which indicates which set (or "lot") of semiconductor packages the marked semiconductor package is included in, an indication of the date on which the semiconductor package was marked, and a serial number for the semiconductor package, which uniquely identifies the semiconductor package at least for the vendor/site/lot combination. In some embodiments, the information included within the 2D mark 106 is encrypted so that the information cannot readily be gleaned by reading the 2D mark 106.

Semiconductor data storage 104 comprises centralized storage that stores the associations between the circuit-based identifier data 109, the 2D mark code 110, and the circuit package data 114. In one embodiment, new entries (where each entry an association between one instance of circuit-based identifier data 109, one instance of a 2D mark code 110, and one instance of circuit package data 114) are stored in the semiconductor data storage 104 when a semiconductor package 102 is assembled.

The circuit package data 114 comprises information about the performance of the IC 105 within the semiconductor package 102. This information can include speed binning data (e.g., a classification of the IC 105 into one of several speed classifications), the device's capability to operate and function per specification at extended temperature ranges, customer specific additional information for advanced device performance capabilities that may extend beyond the published specification for the device. The fact that the device has a 2D mark allows for a single test procedure to obtain the testing data, which can be reviewed and provided to a customer at any time in the future, as well as for assignment of such devices based on order requirements.

In one embodiment, the circuit package data 114 includes more granular data than a categorization of the corresponding semiconductor package 102 into a specific bin. For example, the circuit package data 114 can include result data from testing the semiconductor package 102 (referred to as performance parameters) to determine its maximum and minimum clock or frequency ranges, average or minimum power requirements, leakage current, minimum operating voltage levels, maximum SERDES performance, or maximum block RAM performance. Moreover, the performance parameters stored as the circuit package data 114 can include life expectancy information of the semiconductor package 102 which can be expressed in charts and graphs. The life expectancy information can indicate how the performance or power consumption of the IC 105 changes with time. In one embodiment, the circuit package data 114 can indicate the delta or change of the performance parameters when performing pre-burn in tests of the semiconductor package 102 and post-burn in.

The information stored in semiconductor data storage 104 provides several benefits. By storing circuit package data 114 and associating the circuit package data 114 with the 2D mark code 110, the number of times that testing to obtain performance data needs to occur can be reduced because after testing has been performed, the test data can be obtained by simply reading the 2D mark 106 and then querying the semiconductor data storage 104 to obtain the circuit package data 114 that has already been stored.

In one embodiment, the semiconductor data storage 104 is maintained by the manufacture or the vendor who then provides access to the semiconductor data storage 104 to a customer who purchases the semiconductor package 102. The customer can access the semiconductor data storage 104 and identify the circuit package data 114 for each purchased semiconductor package 102. For example, the customer may have purchased semiconductor packages 102 that are categorized in the same generic bin (e.g., have a min/max performance and minimum power consumption). Using the 2D mark 106, the customer can identify the specific circuit package data 114 corresponding to each semiconductor package 102 which contains more granular performance parameters. In this manner, instead of having to store or write the performance parameters directly on the semiconductor package 102, the vendor can maintain the semiconductor data storage 104 which provides access to the performance data using a network, e.g., the Internet.

Figure 2:
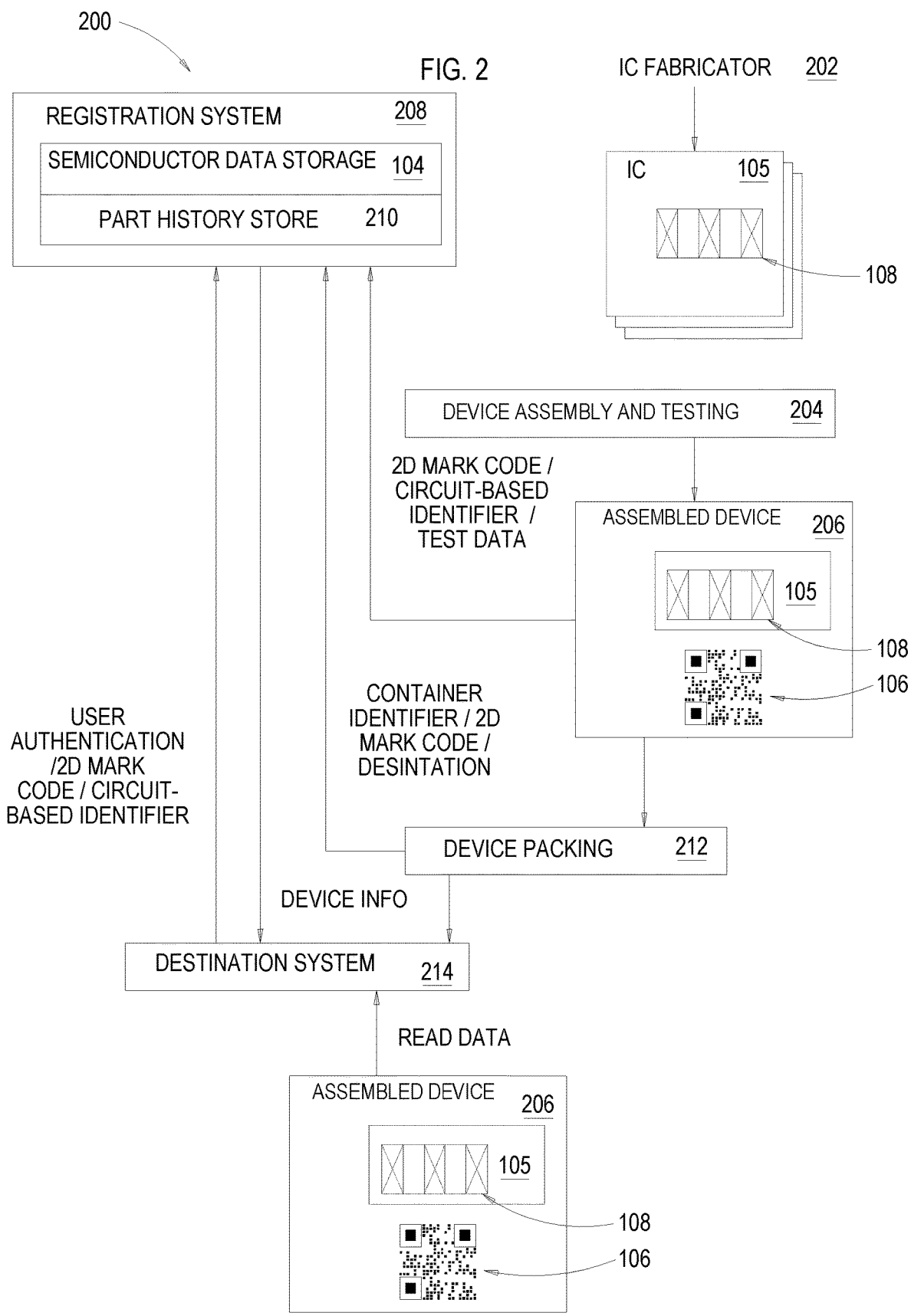
FIG. 2 is a block diagram illustrating product flow for a device having a 2D mark, according to one embodiment.

FIG. 2 is a block diagram illustrating product flow 200 for a device having a 2D mark, according to an embodiment. As shown, a die fabricator 202 manufactures the IC 105 with the circuit-based identifier 108. A device assembly and testing unit 204 packages the ICs 105 to create assembled devices 206 (which are the same as the semiconductor packages 102 of FIG. 1) and marks the assembled devices 206 with 2D marks 106. The device assembly and testing unit 204 tests the ICs 105 and transmits the measured performance parameters, along with the values represented in the 2D marks 106 and the values represented in the circuit-based identifier 108, to a registration system 208. The registration system 208 comprises a centralized repository that includes the semiconductor data storage 104 described with respect to FIG. 1. The registration system 208 may include one or more computer systems with standard components, such as a processor, memory, storage (such as that used for the semiconductor data storage 104), networking components, and the like, that allow the registration system 208 to accept data from remote computer systems and store the data locally. When the registration system 208 receives the data from the device assembly and testing unit 204, the registration system 208 creates and stores entries as shown in FIG. 1, associating the circuit-based identifier data 109, the 2D mark code 110, and the circuit package data 114.

Each of the die fabricator 202, the device assembly and testing unit 204, and the device packing system 212 may comprise one or more types of equipment that are known to perform such functions.

The device packing system 212 packs the assembled devices 206 into one or more containers. The containers may form a logical hierarchy, with assembled devices 206 fitting into smaller containers, which fit into larger containers. Each such container may have an identifying mark. In various embodiments, the device packing system 212 transmits one or more of the identifying marks for one or more of the containers to the registration system 208 for storage in part history store 210. The device packing system 212 also transmits an intended shipping destination to the registration system 208 for storage in the part history store 210. The part history store 210 stores indications of what container(s) particular 2D mark code(s) are associated with and what the intended destination is for any of those particular containers. The part history store 210 may include one or more storage elements such as hard disks, and the like, functionally coupled to appropriate computer systems. In this manner, the part history store 210 associates 2D mark codes with specific destinations. Because the destinations represent, for example, customers that receive assembled devices 206 for end-use, the part history store 210 allows for tracking which assembled devices 206 are shipped to which customers.

The part history store 210 also includes an indication of a "user" ("user credentials") to which one or more circuit packages or one or more containers (containing circuit packages) have been shipped. This user indication indicates which user or users are "authorized" to use circuit packages associated with the user credentials in the part history store 210. In one example, one or more circuit packages are associated with a first set of user credentials, meaning that each such circuit package indicated as being authorized for use by the user is associated with the first set of user credentials.

In one embodiment, the user credentials are also used to provide access to the semiconductor data storage 104. For example, the die fabricator 202 may permit the purchaser to gain access to the semiconductor data storage 104 for a fee or for only a limited time period. In this manner, the user credentials permit the die fabricator 202 to control who has access to the semiconductor data storage 104.

The destination system 214 represents one or more computers associated with the organization (e.g., a customer) to which the assembled devices 206 have been shipped. The destination system 214 receives the assembled devices 206 and may request information or services from the registration system 208. To request such services, the destination system 214 provides authentication information associated with the destination system 214, along with the 2D mark code and the circuit-based identifier data, to the registration system 208. The registration system 208 may provide device information and/or services related to the scanned assembled devices 206. In various embodiments, the registration system 208 verifies the 2D mark code/circuit-based identifier combination to determine whether the device is counterfeit, and may also examine the user authentication data to determine whether the entity (i.e., destination system 214) requesting information or services is the entity for which permission for such information or services has been granted. This verification allows for making a determination of whether the entity requesting information for the circuit package is an authorized user. Verifying user credentials against 2D mark codes can help to track or prevent "grey market" sales of circuit packages. More specifically, grey market sales occur when a customer that purchases circuit packages resells those circuit packages in an unauthorized manner. The registration system 208 "knows" about the authorized user and can check to determine that requests for information are coming from an authorized user. If such requests are not coming from an authorized user, then registration system 208 "knows" that circuit packages are being resold in an unauthorized manner. The registration system 208 can store data regarding the users from which requests for information have been received, as well as the 2D mark codes for which the requests have been received, thus storing "tracking" data for circuit packages.

In addition, the semiconductor data storage 104 permits the customer to retrieve the performance parameters for the individual assembled devices 206. As described in more detail below, the destination system 214 can use the performance parameters to optimize the placement and implement of the assembled devices 206 in larger computing systems.

Figure 3:
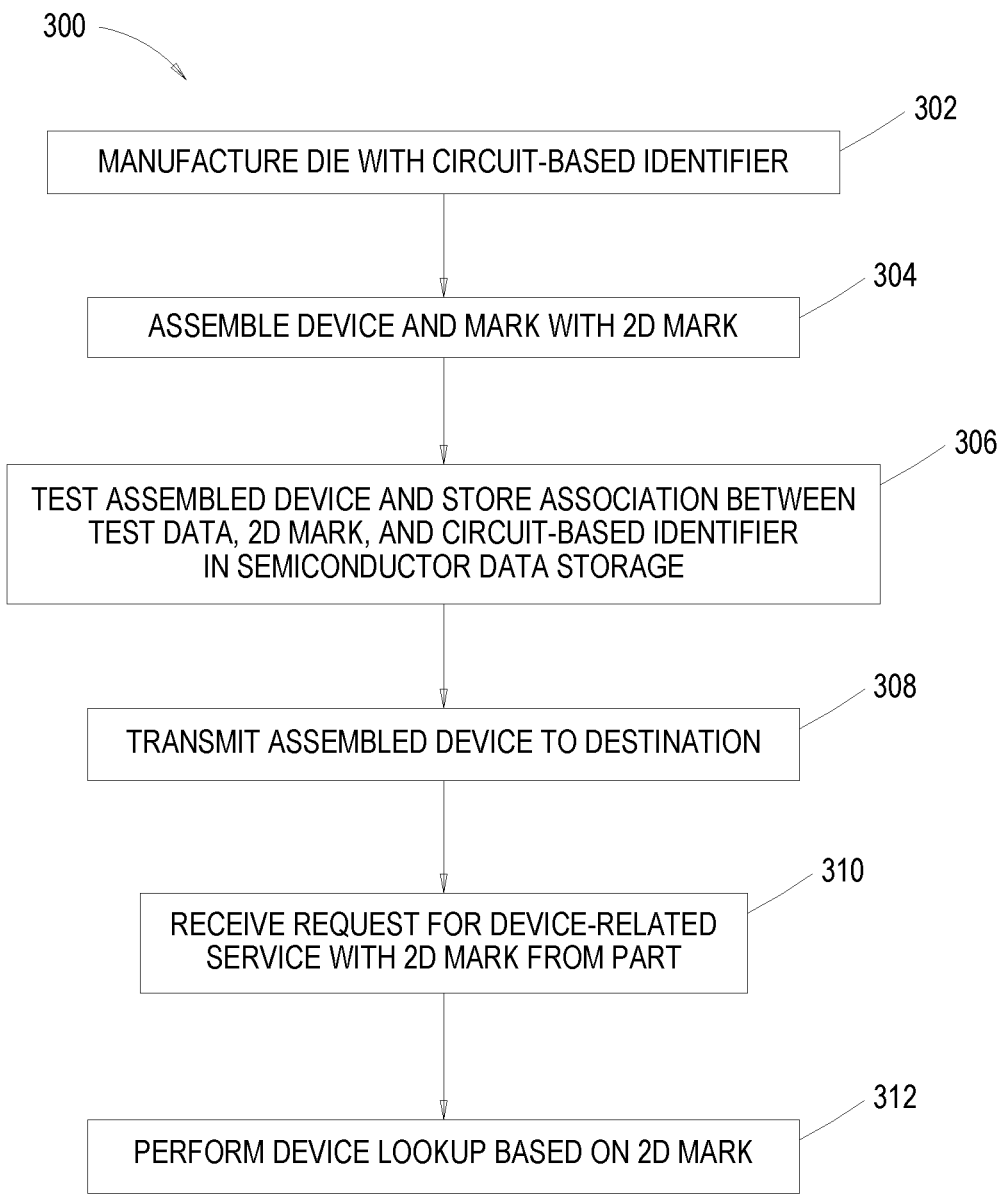
FIG. 3 is a flow diagram of a method for providing part data for an assembled device based on a scannable code, according to one embodiment.

FIG. 3 is a flow diagram of a method 300 for providing part data for an assembled part based on a 2D mark code, according to an example. As shown, a method 300 begins at step 302, where a die fabricator 202 manufactures the IC 105 with a circuit-based identifier 108 as described with respect to FIGS. 1 and 2. At step 304, a device assembly and testing unit 204 assembles the IC 105 into an assembled device 206 and marks the assembled device 206 with a 2D mark 106. At step 306, the device assembly and testing unit 204 tests the assembled devices 206 and records performance parameters for each of the assembled devices 206. The device assembly and testing unit 204 stores an association between the performance parameters, the 2D mark code 110 of the assembled devices 206, and the circuit-based identifier data 109 of the assembled devices 206, in the registration system 208. In one embodiment, the assembled device 206 may include multiple ICs 105. The device assembly and testing unit 204 may treat the multiple ICs 105 as one composite set of performance parameters (e.g., the minimum performance is set by the slowest IC 105 in the assembled device 206, or calculate the total power consumption for all the ICs 105). Alternatively, the device assembly and testing unit 204 may store detailed information separately for each individual die or IC 105 in the assembled device 206 so that the receipt of the assembled device 206 can identify the performance parameters for each of the ICs 105 in the assembled device 206.

Subsequently, a device packing system 212 packs the assembled device 206 into one or more containers and ships the one or more containers to a destination system at step 308. At the destination system, the destination system scans the 2D mark 106 and transmits the 2D mark code 110 obtained to the registration system 208. The destination system also requests performance parameters for the assembled device 206 at step 310. The performance parameters can include manufacturing history, device performance characteristics, device performance distribution within like populations of similar devices, or other services general to all customers or specific to the particular customer to which the device was shipped. The performance parameters can also include device power usage, power distribution within a given device population, device speed performance and distribution, FPGA block level performance (if the device is an FPGA or otherwise similarly programmable device), SERDES (serializer/deserializer) performance, pin-to-pin performance, and other device attributes. At step 312, the requested information and/or services for the assembled device 206 is looked-up based on the 2D mark code 110.

Figure 4:
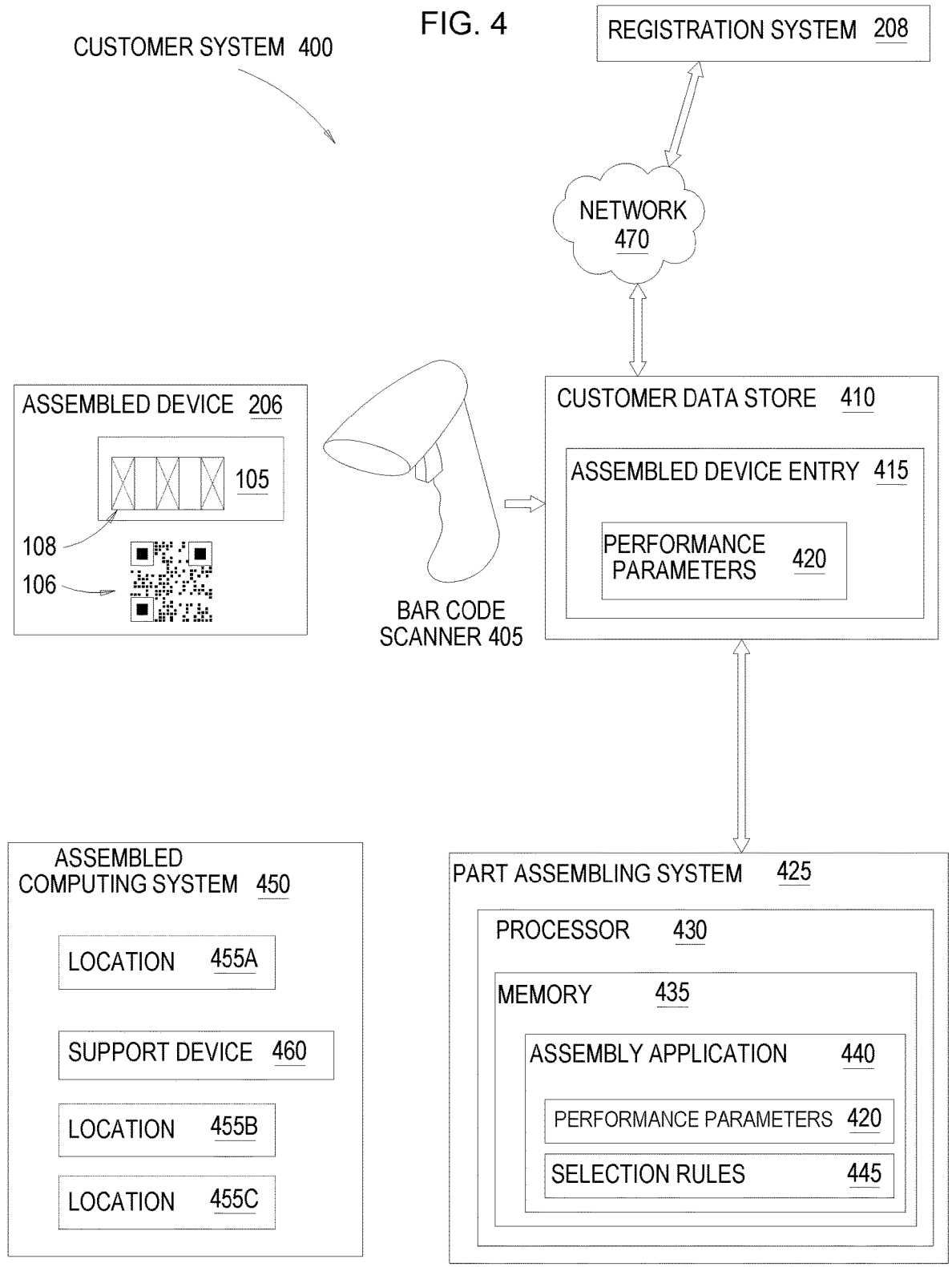
FIG. 4 illustrates optimizing the placement of an assembled device in a larger computing system using performance parameters, according to one embodiment.

FIG. 4 illustrates optimizing the placement of assembled devices 206 in a larger computing system using performance parameters 420, according to one embodiment. FIG. 4 illustrates a customer system 400 which includes the assembled device 206 (which may have been purchased from the die fabricator 202 in FIG. 2 or from some other vendor), a bar code scanner 405, a customer data store 410, a part assembling system 425, and an assembled computing system 450.

The customer system 400 (e.g., a destination system 214) can use the bar code scanner 405 to scan the 2D mark 106 on the assembled device 206 (which may be shipped to the customer system 400 on trays). As described in the method 300, the system 400 can use the data embedded in the 2D mark 106 to retrieve information from the registration system 208 about the assembled device 206. In this embodiment, the customer system 400 retrieves the performance parameters 420 for each of the assembled devices 206 which are stored in the customer data store 410. In one embodiment, the performance parameters 420 are generated from testing the assembled devices 206 and can include their maximum and minimum clock or frequency ranges, average or minimum power requirements, leakage current, minimum voltage levels, life expectancy information, changes in these parameters over time, or any other of the parameters described above.

As shown, the customer data store 410 (e.g., a database) includes assembled device entries 415 which may correspond to a respective one of the assembled devices 206. For example, when a new shipment of assembled devices 206 arrives, the customer system 400 may scan the 2D marks 106 for each device 206 and create a new assembled device entry 415 for each of the assembled devices 206 in the customer data store 410. Using a network 470 (e.g., a private or public network), the customer data store 410 can access the registration system 208 to retrieve the performance parameters 420 (assuming the customer system 400 is authorized). Once retrieved, the customer data store 410 can store the performance parameters 420 in the corresponding assembled device entries 415.

The part assembly system 425 includes a processor 430 and a memory 435. The processor 430 represents any number of processing elements which each can contain any number of processing cores. The memory 435 can include volatile memory elements, non-volatile memory elements, or a combination of both. Moreover, the memory 435 can include local memory elements as well as remote storage locations.

The memory 435 contains an assembly application 440 (e.g., a software application) that determines which of the assembled devices 206 should be connected to the assembled computing system 450. Put differently, the assembly application 440 determines, using the performance parameters 420, which of the assembled devices 206 should be placed into the assembled computing system 450—e.g., a larger computing system. To do so, the assembly application 440 stores selection rules 445 which enable the application 440 to evaluate the performance parameters 420 for the assembled devices 206 (also referred to as "parts") to determine an optimized solution for the assembled computing system 450.

The assembled computing system 450 includes locations 455A-C for the assembled devices 206. That is, in this embodiment, the assembled computing system 450 has locations 455 for three of the assembled devices 206. For example, the assembled devices 206 may be memory units, FPGAs, processor units, hardware accelerators, and the like.

The locations 455 may include different connectors that mate with corresponding connectors in the assembled devices 206. In another embodiment, the locations 455 may include bonding pads where a connective material (e.g., a solder or conductive adhesives) is used to couple the assembled devices 206 to the assembled computing system 450. In one embodiment, the assembled computing system 450 is a standalone computing device such as a desktop computer, a laptop, a server, and the like. In another embodiment, the assembled computing system 450 may be a part of computing device. For example, the assembled computing system 450 may include a printed circuit board which has the locations 455 on which the assembled devices 206 are mounted.

In addition to the locations 455, the assembled computing system 450 includes a support device 460 which may be an auxiliary system used by the assembled device 206 when mounted to the assembled computing system 450. For example, the assembled device 206 may be an FPGA while the support device 460 is a memory unit that interfaces with the FPGA. The performance of the support device 460 may affect what assembled device 206 should be mounted in the locations 455A (which is communicatively coupled to the support device 460). For example, one of the selection rules 445 may indicate that the assembled device 206 placed at location 455A should operate at a frequency that is within a threshold of the operating frequency of the support device 460. In one embodiment, the assembled devices 206 may have been categorized into the same performance bin which has a corresponding performance range (e.g., a minimum and maximum operating frequency). For example, the assembled devices 206 may include integrated circuits that are fabricated on the same wafer or different wafers. Because of process variation, the integrated circuits on the same wafer have different performance parameters, and thus, may be categorized into different bins. By testing the integrated circuits in the wafers, the manufacture can organize the integrated circuits into different bins once the integrated circuits are separated from the wafer.

Some of the assembled devices 206 in the performance bin may be able to operate at (or above) the threshold frequency while others cannot (assuming the threshold frequency is within the range of the performance bin). Without retrieving the performance parameters 420 for each of the assembled devices 206, the system designer would have to over design the assembled computing system 450 so that any of the assembled devices 206 could be placed in the location 455A and interface with the support device 460. However, because the assembly application 440 has access to the performance parameters 420, the assembly application 440 can identify which ones of the assembled devices 206 can meet or exceed the desired threshold operating frequency for interfacing with the support device 460 and select these assembled devices 206 for the locations 455A in the assembled computing systems 450. In this manner, the assembly application 440 can optimize the performance of the system 450.

In one embodiment, the assembly application 440 may test the support device 460 to determine a performance metric. Once known, the assembly application 440 can compare the performance metric to the performance parameters 420 using the selection rules 445 to determine which of the assembled devices 206 is best suited to be placed in the location 455A. For example, the support device 460 may be a memory device whose performance (e.g., read/write rate) can vary because of process variations. If the memory device has a faster read/write rate, the assembly application 440 can choose an assembled device 206 which can provide faster read/write commands than other ones of the assembled devices 206. The reverse is also true. If the assembly application 440 determines that the memory device is slower, the assembly application 440 selects a slower assembled device 206 which reserves the faster assembled devices 206 to be used with support devices in other assembled computing systems 450 which may be faster. Thus, the assembled computing system 450 (or systems) can be optimized.

In another embodiment, the selection rules 445 permit the assembly application 440 to place the assembled devices 206 in the locations based on power consumption or heat generation. For example, the total power draw of the assembled computing system 450 may be critical. Thus, the selection rules 445 may indicate the total power that can be drawn by the assembled devices 206 placed at the locations 455A-C which is known by evaluating the performance parameters 420 for the assembled devices 206. That is, if the assembly application 440 knows the power consumption of the assembled device 206, the application 440 can ensure that the assembled devices 206 chosen for the locations 455A-C do not exceed the total power consumption for the assembled computing system 450.

In another example, the selection rules 445 may control which of the locations 455 is selected for an assembled device 206 in response to the heat generated by the devices 206. For example, the location 455A may be closer to a fan in the assembled computing system 450, and thus, receive a greater airflow than the location 455C. As such, the selection rules 445 may indicate that the assembly application 440 should place the assembled device 206 that generates the most heat at location 455A.

In one embodiment, the assembly application 440 evaluates multiple rules 445 for deciding which of the assembled devices 206 are placed at the locations 455. The assembly application 440 may use a hierarchy to determine which rules 445 take precedent or use a weighting scheme to select the optimal assembled devices 206. For example, for location 455A, the assembly application 440 may identify all of the assembled devices 206 having an operating frequency above a first threshold and then rank the identified assembled devices 206 according to power consumption. In contrast, for location 455C, the assembly application 440 may identify all the assembled devices 206 that can operate at or below a particular minimum voltage level and have a leakage current less than a threshold. In this manner, the assembly application 440 can use any number of selection rules 445 to evaluate the performance parameters 420

FIG. 5 is a flow diagram of a method 500 for assembling a computing system using performance parameters for individual parts, according to an embodiment. At block 505, the customer data store 410 receives performance parameters 420 from the registration system 208. In one embodiment, method 500 begins after method 300 ends. That is, after the requested performance parameters 420 are identified based on the 2D mark code 110, the registration system 208 forwards the performance parameters 420 to the customer data store 410 which are then indexed and stored at the corresponding assembled device entries 415.

At block 510, the assembly application 440 identifies available assembled devices 206. In one embodiment, the data store 410 indicates whether the assembled devices 206 purchased by the customer have already been placed, or are reserved for one of the assembled computing system 450. For example, the customer data store 410 may include a flag in each of the assembled device entries 415 to indicate whether the corresponding assembled device 206 have already been placed into, or selected for, one of the assembled computing systems 450. As such, the assembly application 440 can identify which of the assembled devices 206 are still available for placement into one of the assembled computing systems 450.

At block 515, the assembly application 440 identifies compatible parts from the available assembled devices 206 to place in a larger computing system (e.g., the assembled computing system 450) using the selection rules 445. As mentioned above, the selection rules 445 provides tools for evaluating the performance parameters 420 to select a compatible (or optimal) assembled device 206 to place in one of the locations 455 in the assembled computing system 450. The assembly application 440 may evaluate one selection rule 445 or multiple selection rules 445.

In one embodiment, the assembled devices 206 are part of the same performance or power bin, but this is not a requirement. For example, the die fabricator 202 may sell the assembled devices 206 in generic bins rather than as individual parts since organizing and managing each of the devices is too unwieldly. However, by making the performance parameters available to the customer, the customer can use the parameters to individual evaluate each of the assembled devices 206 regardless whether the assembled devices 206 are in the same bin or different bins as categorized by the die fabricator.

The selection rules 445 can include criteria such as thresholds for evaluating the performance parameters. For example, one rule 445 may require that the total power consumed by the parts placed on the assembled computing system 450 is less than a power threshold which is based on a leakage current. In another example, a rule 445 may require that the operating frequency of the part be in the top 10% of the range of operating frequencies of the bin in which the parts are categorized.

Further, the parts do not need to be the same type. In one embodiment, the performance parameters 420 and selection rules 445 can be used to choose multiple different types of parts to place in the assembled computing system 450. For example, a FPGA may be placed in the location 455A in FIG. 4 while memory devices are placed in locations 455B and 455C. Although the parts are different, the selection rules 445 may state that the total power consumed by the parts (e.g., both the FPGA and the memory devices) should be less than a threshold, or that the operating frequencies of the parts should be within 5% of each other.

In another embodiment, the particular part type selected for one location 455 may affect the types of part for the other locations. For example, if a Part Type L1, L2, or L3 are placed at the location 455A then a Part Type L1, L2, L3, M1, M2, or M3 can be placed at the locations 455B and 455C (wherein L and M represent types of parts such as different versions or model numbers). However, if a Part Type M1, M2, or M3 is placed at the location 455A then a Part Type H1, H2, or H3 must be placed at locations 455B and 455C. Further, some rules 445 may exclude certain types of parts from certain locations—e.g., the Part Types H1, H2, and H3 cannot be placed at the location 455A.

In one embodiment, when multiple selection rules 445 are considered for selecting a part for location, all the selection rules 445 must be satisfied (e.g., the part chosen for the location 455A must have a certain operating frequency and cannot be Parts H1, H2, and H3) or only a portion of selection rules 445 must be satisfied. As an example of the latter, the selection rules 445 may state that the part for the location 445B should have an operating frequency above a first threshold and, if possible, a minimum operating voltage below a second threshold. However, if no assembled devices 206 satisfy both selection rules 445, the assembly application 440 selects one of the assembled devices 206 that satisfies the first rule—i.e., an operating frequency above a first threshold. For example, the selection rules 445 may be organized in a hierarchy such that the assembly application 440 determines which of the available assembled devices satisfies the most of the higher priority selection rules 445 to place at a particular location.

At block 520, the customer places the compatible parts identified at block 515 in the large computing system—e.g., the assembled computing system 450. For example, the assembled devices 206 may be plugged into the assembled computing system 450 using male/female connectors, or solder bonded, wire bonded, or epoxied on the assembled computing system 450. Once assembled, the computing system 450 may be shipped to another customer or added to an even larger computing system.

At block 525, the assembly application 440 updates the customer data store 410 to indicate that the selected parts are no longer available. That is, the customer data store 410 reflects the fact that the assembled devices 206 selected for the locations 445A-C are no longer available. For example, the customer data store 410 may switch the state of a flag in the corresponding assembled device entries 415 or delete the entries 415.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects described herein may take the form of an entirely hardware embodiment, an entirely software embodiment (including firmware, resident software, micro-code, etc.) or an embodiment combining software and hardware aspects that may all generally be referred to herein as a "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method comprising:
    scanning an identifying code using a scanning device, wherein the identifying code is disposed in a semiconductor package that includes an integrated circuit and scanning the identifying code comprises querying a database using a unique identifier, wherein the identifying code encodes the unique identifier and the unique identifier is associated with circuit-based identifier;
    receiving different performance parameters corresponding to the integrated circuit from the querying of the database using the unique identifier;
    determining whether the integrated circuit satisfies a plurality of different predefined operation selection rules corresponding to a first location in an assembled computing system using the different performance parameters; and
    placing the semiconductor package in the first location on the assembled computing system.

2. The method of claim 1, further comprising:
scanning a plurality of identifying codes, each of which are disposed in a respective semiconductor package that includes a respective integrated circuit; and
receiving respective performance parameters corresponding to the respective integrated circuits using identifier data retrieved from scanning the plurality of identifying codes.

3. The method of claim 2, further comprising:
determining that the respective integrated circuits do not satisfy the plurality of different predefined operation selection rules corresponding to the first location in the assembled computing system using the respective performance parameters.

4. The method of claim 3, further comprising:
storing the respective performance parameters in a data store in respective data entries corresponding to the respective semiconductor packages; and
determining, before determining that the respective integrated circuits do not satisfy the plurality of different predefined operation selection rules, whether the respective semiconductor packages are available for placement on the assembled computing system by querying the data store.

5. The method of claim 2, further comprising:
evaluating the assembled computing system for additional packages that affect compatibility of the semiconductor package at the first location.

6. The method of claim 2, further comprising:
determining an optimal integrated circuit to place at a second location of the assembled computing device by comparing the respective performance parameters with at least one predefined operation selection rule corresponding to the second location; and
placing the respective semiconductor package corresponding to the optimal integrated circuit at the second location.

7. The method of claim 1, wherein a predefined operation selection rule of the plurality of different predefined operation selection rules defines at least one of a minimum performance value and a maximum power consumption that the integrated circuit must have to be placed at the first location.

8. The method of claim 1, wherein the identifying code comprises at least one of a one-dimensional, two-dimensional, and three-dimensional bar code, wherein the different performance parameters are retrieved from a registration system maintained by a first entity that sold the semiconductor package
wherein retrieving the performance parameter from the registration system comprises:
transmitting authorization data to the registration system which uses the authorization data to determine whether a second entity requesting the performance parameter has permission to access the performance parameter.

9. The method of claim 1, wherein the different performance parameters comprise at least one of maximum and minimum operational frequency ranges of the integrated circuit, average power requirements of the integrated circuit, minimum power requirements of the integrated circuit, a leakage current of the integrated circuit, a minimum voltage operational level of the integrated circuit, and life expectancy information of the integrated circuit.

10. A system, comprising:
a bar code scanner configured to scan an identifying code disposed in a semiconductor package that includes an integrated circuit;
a processor; and
a memory comprising an assembly application, wherein the assembly application, when executed by the processor performs an operation comprising:
querying a database using a unique identifier generated by the bar code scanner scanning the identifying code, wherein the identifying code encodes the unique identifier and the unique identifier is associated with circuit-based identifier;
receiving different performance parameter corresponding to the integrated circuit from the querying of the database using the unique identifier,
determining whether the integrated circuit satisfies a plurality of different predefined operation selection rules corresponding to a first location in an assembled computing system using the different performance parameters, wherein the plurality of different predefined operation selection rules indicates a maximum power consumption threshold and a minimum operational frequency threshold for the first location; and
instructing the semiconductor package to be placed in the first location on the assembled computing system.

11. The system of claim 10, wherein the operation comprises:
receiving respective performance parameters corresponding to respective integrated circuits using identifier data retrieved from scanning a plurality of identifying codes, wherein each of the plurality of identifying codes is disposed in a respective semiconductor package that includes one of the respective integrated circuits,
wherein the respective performance parameters comprise at least one of maximum and minimum operational frequency ranges of the integrated circuits, average power requirements of the integrated circuits, minimum power requirements of the integrated circuits, a leakage current of the integrated circuits, a minimum voltage operational level of the integrated circuits, and life expectancy information of the integrated circuits.

12. The system of claim 11, wherein the operation comprises:
determining that the respective integrated circuits do not satisfy the plurality of different predefined operation selection rules corresponding to the first location in the assembled computing system using the respective performance parameters.

13. The system of claim 11, wherein the operation further comprises:
evaluating the assembled computing system for additional packages that affect compatibility of the semiconductor package at the first location.

14. The system of claim 11, wherein the operation further comprising:
determining that the integrated circuit is a more optimal candidate for a second location of the assembled computing system by comparing the respective performance parameters with at least one predefined operation selection rule corresponding to the second location; and
placing the respective semiconductor package corresponding to the optimal integrated circuit at the second location.

15. The system of claim 10, wherein a predefined operation selection rule of the plurality of different predefined operation selection rules defines at least one of a minimum performance value and a maximum power consumption that the integrated circuit must have to be placed at the first location.

16. The system of claim 10, wherein the identifying code comprises at least one of a one-dimensional, two-dimensional, and three-dimensional bar code, wherein the different performance parameters are retrieved from a registration system maintained by a first entity that sold the semiconductor package.

17. A computer readable storage medium comprising:
computer-readable program code, wherein, when executed by a computing processor, the computer-readable program code performs an operation comprising:
receiving data from scanning an identifying code using a scanning device, wherein the code is disposed in a semiconductor package that includes an integrated circuit wherein scanning the identifying code comprises querying a database using a unique identifier, wherein the identifying code encodes the unique identifier and the unique identifier is associated with circuit-based identifier;
receiving different performance parameters corresponding to the integrated circuit from the querying of the database using the unique identifier,
determining whether the integrated circuit satisfies a plurality of different predefined operation selection rules corresponding to a first location in an assembled computing system using the different performance parameters, and
instructing the semiconductor package to be placed in the first location on the assembled computing system.

18. The computer readable storage medium of claim 17, wherein the operation comprises:
receiving respective performance parameters corresponding to respective integrated circuits using identifier data retrieved from scanning a plurality of identifying codes, wherein each of the plurality of identifying codes is disposed in a respective semiconductor package that includes one of the respective integrated circuits.

19. The computer readable storage medium of claim 18, wherein the operation comprises:
determining that the respective integrated circuits do not satisfy the plurality of different predefined operation selection rules corresponding to the first location in the assembled computing system using the respective performance parameters
wherein the respective performance parameters comprise at least one of maximum and minimum operational frequency ranges of the integrated circuits, average power requirements of the integrated circuits, minimum power requirements of the integrated circuits, a leakage current of the integrated circuits, a minimum voltage operational level of the integrated circuits, and life expectancy information of the integrated circuits.

20. The computer readable storage medium of claim 19, wherein the operation comprises:
storing the respective performance parameters in a data store in respective data entries corresponding to the respective semiconductor packages; and
determining, before determining that the respective integrated circuits do not satisfy the plurality of different predefined operation selection rules, whether the respective semiconductor packages are available for placement on the assembled computing system by querying the data store.

* * * * *